United States Patent
Bersted et al.

(10) Patent No.: US 6,531,529 B2
(45) Date of Patent: Mar. 11, 2003

(54) FLAME RETARDANT ANTI-DRIP POLYAMIDE COMPOSITIONS

(75) Inventors: Bruce H. Bersted, Alpharetta, GA (US); Mark G. Reichmann, Roswell, GA (US)

(73) Assignee: Solvay Advanced Polymers, L.L.C., Alpharetta, GA (US)

( * ) Notice: Subject to any disclaimer, the term of this patent is extended or adjusted under 35 U.S.C. 154(b) by 0 days.

(21) Appl. No.: 09/739,717

(22) Filed: Dec. 18, 2000

(65) Prior Publication Data

US 2001/0053819 A1 Dec. 20, 2001

Related U.S. Application Data

(62) Division of application No. 09/237,000, filed on Jan. 25, 1999, now Pat. No. 6,207,745.
(60) Provisional application No. 60/073,631, filed on Feb. 4, 1998.

(51) Int. Cl.[7] .............................. C08L 77/00; C08J 3/38
(52) U.S. Cl. ...................... 524/404; 524/410; 525/133; 525/179; 525/183
(58) Field of Search ................................. 525/179, 183, 525/133; 524/404, 410

(56) References Cited

FOREIGN PATENT DOCUMENTS

CA     2019904    *   6/1990

* cited by examiner

*Primary Examiner*—Ana Woodward
(74) *Attorney, Agent, or Firm*—McDermott, Will & Emery

(57) ABSTRACT

This invention is a flame-retardant, anti-dripping polyamide composition comprising a high temperature polyphthalamide, a halogen-containing organic compound, and an anti-drip effective amount of an anti-drip component comprising a polymer formed from at least one ethylenically unsaturated monomer and at least one carboxylic acid containing monomer.

20 Claims, No Drawings

FLAME RETARDANT ANTI-DRIP POLYAMIDE COMPOSITIONS

CROSS-REFERENCE TO RELATED APPLICATIONS

This application is a Divisional of U.S. application Ser. No. 09/237,000 U.S. Pat. No. 6,207,745 filed Jan. 25, 1999 which in turn claimed the benefit of U.S. Provisional application No. 60/073,631, filed Feb. 4, 1998.

BACKGROUND OF THE INVENTION

This invention relates to flame retardant polyamide compositions. More particularly, this invention relates to flame retardant polyamide compositions which have excellent anti-drip characteristics when exposed to flames.

The trend toward integration of electronic components has led to an increasing need for plastic materials having much greater heat resistance and flame retardant properties, particularly for use in connectors, circuit boards, semiconductor packages and the like. Where such devices are used continuously or are used in demanding environments, they may encounter extremely high temperatures. Further improvements in heat resistance and flame retardant properties for such materials are thus continually being sought by the industry.

Partially aromatic polyamides, typified by polymers comprising hexamethylene diamine terephthalamide units, have excellent mechanical strength, rigidity, heat resistance and moisture resistance. These polyamides are finding wide acceptance for use as engineering plastics, particularly in applications where elevated temperatures and severe environments may be encountered, for example, in electrical appliance parts, in connectors and similar parts for electrical and electronic devices and in a variety of automotive applications. Filled compositions comprising such polyamides in combination with reinforcing fillers such as glass fibers are also useful where further improvement in heat resistance and rigidity is required.

Like most other thermoplastic resins, polyamides are subject to burning. When the polyamide is to be used in applications requiring self-extinguishing characteristics and flame retardant properties it is necessary to resort to the addition of a fire retardant. Halogen-containing organic compounds such as a halogenated polystyrene, polydibromostyrene, or a condensation product of brominated phenol to polyamides have been used to impart fire-retarding properties in certain polyamide formulations. Antimony compounds are also used in combination with the halogen-containing organic compounds to improve flame retarding properties.

In addition to flame retarding for some polyamide applications, it is required that the polyamide composition, when exposed to a flame, have a reduced tendency to drip. A dripping polymer is a hazard and technology has been developed to reduce the dripping by adding a PTFE additive. However, PTFE when used in a polyamide formulation can agglomerate and cause problems in the molding process used to make molded parts from the polyamide composition. The art, therefore, needs a polyamide composition that is flame retardant, has good anti-drip properties and does not agglomerate. This invention provides for such polyamide composition.

SUMMARY OF THE INVENTION

This invention is a flame-retardant, anti-dripping polyamide composition comprising a polyamide, a halogen-containing organic compound, and an anti-drip effective amount of an anti-drip component comprising a polymer formed from at least one ethylenically unsaturated monomer and at least one carboxylic acid containing monomer.

DETAILED DESCRIPTION OF THE PREFERRED EMBODIMENTS

The improved flame-retardant, anti-drip polyamide compositions of this invention comprise a polyamide, preferably a high temperature polyamide, and more preferably a fiber-filled high temperature polyamide, flame retarded with a halogen-containing flame retardant compound together with a low level of an anti-drip polymer comprising a polymer formed from at least one ethylenically unsaturated monomer and at least one carboxylic acid containing momomer. The improved flame retarded polyamide composition of this invention will preferably be a glass fiber-filled partially aromatic polyamide containing an organic, bromine-containing flame retardant. The anti-drip properties of the composition of this invention are provided by adding thereto an anti-drip effective amount of the anti-drip polymer to the composition. By partially aromatic polyamide is meant a polymer containing units derived from one or more aliphatic diamines and one or more aromatic dicarboxylic acids, including copolymers containing such units.

Although any polyamide can be used in the practice of this invention such as nylon 6,6 or nylon 4,6, the preferred polyamides suitable for use in the practice of this invention include the various linear, thermoplastic, high temperature, partially aromatic polyamides and copolymer analogs thereof, frequently termed partially aromatic nylons. Polyamides that are crystalline or crystallizable are preferred, and particularly preferred are the crystalline or semi-crystalline, high temperature copolyamides comprising terephthalamides of aliphatic diamines. Such copolyamides will comprise as structural units terephthalamides of one or more $C_4$–$C_{14}$ aliphatic diamines such as hexamethylene diamine or the like, including diamines having one or more $C_1$–$C_4$ alkyl substituents attached to the hydrocarbon portion. In addition to the terephthalamide units, these copolyamides may further comprise as structural units one or more additional diamides of such aliphatic diamines, for example, diamides derived from aromatic dicarboxylic acids or related compounds such as isophthalic acid, naphthalene dicarboxylic acid or the like, as well as diamides derived from aliphatic diamines and $C_4$–$C_{14}$ aliphatic dicarboxylic acids or related compounds such as diamide units derived from adipic acid, sebacic acid, cyclohexane dicarboxylic acid and similar dicarboxylic acids.

A variety of polyamides comprising terephthalamide units are known in the art including, for example, copolyamides comprising a combination of hexamethylene terephthalamide units and hexamethylene adipamide units, optionally including hexamethylene isophthalamide units. Particularly suitable for use in the practice of this invention are copolyamides comprising at least 50 mole % hexamethylene terephthalamide units, the balance being hexamethylene adipamide units, either alone or in combination with up to about 30 mole % hexamethylene isophthalamide units. Further examples of polyamides that may be suitable for these purposes are the well known crystallizable polyamides comprising terephthalamides of two or more diamines such as hexamethylene diamine and 2-methyl-pentamethylene diamine.

In greater detail, the polyamide component of the invented compositions may be a crystallizable polyamide comprising at least about 40 mole %, preferably from about 40 to about 100 mole %, recurring aliphatic diamine terephthalamide units which may be further described as represented by the following structural formula:

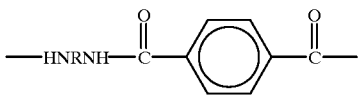

wherein R comprises at least one aliphatic hydrocarbyl radical.

Preferably, aliphatic radicals R in the above formula will comprise at least one straight chain, branched or cyclic, substituted or unsubstituted aliphatic radical having from about 4 to about 14 carbon atoms. Polyamides comprising such radicals exhibit good crystallinity and desirable high temperature properties, together with melting and thermal degradation temperatures making them well suited for melt processing and fabricating in injection molding and extrusion operations. Specific examples of suitable aliphatic radicals include tetramethylene, hexamethylene, dodecamethylene and the like, as well as their alkyl-substituted analogs such as 2-methylpentamethylene, 2,4-dimethylhexamethylene and the like, and cyclic analogs such as p-cyclohexyl and the like. Most preferably, R in the formula comprises a hexamethylene radical, either alone or as mixture with additional aliphatic 4 to 14 carbon atom radicals. The preferred polyamide components will have a melting point of at least about 270° C. as a result of the high content of terephthalamide units; still more preferred are polyamide components melting at about 290° C. to about 330° C.

The preferred polyamides may be more particularly described as crystallizable or semi-crystalline partially aromatic polyamides of fast or intermediate crystallization rate comprising recurring units corresponding to structural formulas A, B and C, shown below, in proportions of about 40 to about 100 mole % A, 0 to about 35 mole % B and about 0 to about 60 mole % C.

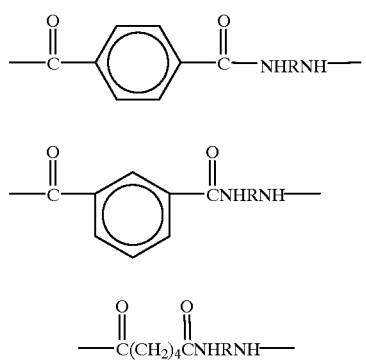

In the above formulas, R comprises at least one aliphatic hydrocarbyl radical as described hereinabove, and may represent a mixture of aliphatic 4 to 14 carbon radicals; the mole ratio of the units A, B and C may lie in the range of from about 40–100:35-0:60-0, or about 40–100:35-0:50-0.

More preferred among such polyamides are those wherein the mole ratio of the units A, B and C lies in the range of from about 40–90:35-0:50-5, and still more preferable are those within the range of from about 40–70:25-0:50-5, because such compositions exhibit excellent thermal and mechanical properties. Such polyamides have melting points of about 290 to about 350° C. glass transition temperatures ($T_g$) of about 90 to about 130° C. and inherent viscosities generally ranging from about 0.7 to about 1.4 dl/g, with about 0.8 to about 1.2 dl/g being preferred from the standpoint of properties of molded parts and ease of molding.

Especially preferred among such polyamides are those wherein R in the above formulas comprises hexamethylene. Also highly suitable as the polyamide component of the invented compositions are polyamides comprising two of the units A, B and C shown above, such as those with mole ratios of A:B:C in the range of from 40–65:0:60-35, or 50–65:0:50:35. For example, polyamides containing A, B and C units at ratios of 50:0:50, 60:0:40, 65:0:35 and 55:0:45 are widely known and described in the art, while terpolymers with minor amounts of the isophthalamide component B, for example, in mole ratios such as 50:5:45, 40:5:55 and the like, may be found particularly desirable for use where lower melt temperatures will be encountered.

Other suitable copolymers comprising terephthalamide units are known and have been described in the art. For example, copolymers comprising hexamethylene terephthalamide and caprolactam units, and terpolymers comprising hexamethylene terephthalamide, hexamethylene adipamide and caprolactam units have been available from commercial sources, and these may also be found useful. Blends of one or more polyamides can also be used in the composition of this invention.

These and other suitable partially aromatic polyamide and copolyamide resins are fully described in the art, for example, in U.S. Pat. Nos. 4,831,108; 5,112,685; 4,163,101 and RE34,447, and in U.S. Pat. Nos. 5,288,793, 5,378,800; 5,322,923 and 5,218,082; the teachings of these patents and applications are hereby incorporated herein by reference. Partially aromatic polyamides are readily prepared using processes known and described in the art such as, for example, the continuous and batch processes set forth in U.S. Pat. Nos. 4,603,193; RE34,447 and 5,387,645 incorporated herein by reference. A variety of suitable copolyamides are readily available from commercial sources. For example, polyphthalamides comprising hexamethylene diamine terephthalamide units together with one or more additional units such as hexamethylene adipamide units, hexamethylene isophthalamide units, caprolactam units and the like are available from a variety of commercial sources, including Arlen® polyamides from Mitsui Corporation. Ultramid polyamides from BASF, and Amodel® polyphthalamide resins from Amoco Polymers, Inc.

The term "polyphthalamide" as set forth in ASTM D5336-93 is reserved for polyamides wherein the combined content of terephthalamide and isophthalamide units is at least 60 mole %. However, through common use in the art, the term has become widely understood as including any polyamide that contains phthalamide units irrespective of the amount of such units or whether the units are terephthalamide or isophthalamide units.

The molecular weight of the polyamide will be generally selected to meet the requirements of the particular end use envisioned and of the processing methods contemplated for the fabrication, according to practices widely known in the resin arts. For example, fiber grade polyamides will be best suited when fiber and filament uses are contemplated, while those identified by the art as extrusion grade and injection molding grade resins will be employed for those uses. Such resins may be further described as generally having inherent viscosities greater than about 0.6 dl/g, preferably greater than about 0.7 dl/g, when measured at 30° C. dissolved in a 60/40 phenol/tetrachloroethylene (TCE) mixture at a concentration of 0.4 g/dl. Although there is no particular upper limit for molecular weight to be suitable for use in these compositions, very high molecular weight polyphthalamides, those with an inherent viscosity as great as 2.0 dl/g or even greater, may be extremely difficult to process thermally, and hence will not be preferred.

The anti-drip polymer additive useful in the composition of this invention is suitably a polymer obtained by polymerizing one or more ethylenically unsaturated monomers such as ethylene, propylene, a butene or other olefin or di- or tri-olefin having 2 to about 8 carbon atoms, preferably 2 to 6 carbon atoms, with one or more unsaturated, preferably alpha-beta unstaturated, carboxylic acid containing monomers preferably having 3 to 6 carbon atoms. The ethylenically unsaturated monomer can also be selected from styrene or vinyl acetate and the like. Preferably, the ethylenically unsaturated monomer in the anti-drip polymer additive comprises ethylene, propylene or a mixture thereof, and more preferably comprises ethylene. The carboxylic acid monomer, in addition to being in the acid form, can be an ester, amide, or anhydride or other equivalent of an acid group. Carboxylic acid monomers such as acrylic acid, methacrylic acid, maleic acid or anhydride, fumaric acid, and the like, are suitable. The amount of monomers containing the carboxylic acid group can be in the range of about 0.1 to about 25 percent, preferably about 0.2 to about 15 percent by weight relative to the total weight of the anti-drip polymer. The anti-drip polymer additive useful in the method of this invention can be made by copolymerizing the monomers or can be made by grafting the carboxylic acid monomer or monomers to the polymer made by polymerizing the ethylenically unsaturated monomer or monomers such as those mentioned above. This grafting can be achieved by reacting one or more carboxylic acid monomer, such as maleic anhydride, acrylic acid, methacrylic acid, maleic acid fumaric acid, itaconic acid, crotonic acid, 5-norbornene -2,3-dicarboxylic acid, monomethyl fumurate, monomethyl maleate, and the like, with the polymer made from polymerizing the ethylenically unsaturated monomer or monomers mentioned above using standard methods known to those of skill in the art such as by the use of free radical generating agents or by thermal reaction. For example, a polyethylene, polypropylene, ethylene/propylene copolymer, ethylene/propylene/diene terpolymer, ethylene/propylene/styrene terpolymer, an ethylene/vinyl acetate copolymer, or ethylene/propylene/vinyl acetate terpolymer can be reacted with one or more of the hereinabove listed acids and anhydrides to graft the acid or anhydride to the hydrocarbon polymer to form polymers useful in the compositions of this invention. The amount of acids and/or anhydrides incorporated by grafting is suitably about 0.05 to about 10 weight percent of the polymer. A combination of copolymerization and grafting can be used as well. Examples of polymers made by copolymerization are ethylene/acrylic acid copolymers, ethylene/methacrylic acid copolymers, ethylene/itaconic acid copolymers, ethylene/methyl hydrogen maleate copolymers, ethylene/maleic acid copolymers, ethylene/acrylic acid/methyl methacrylate copolymers, ethylene/methacrylic acid/ethyl acrylate copolymers, ethylene/itaconic acid/methyl methacrylate copolymers, ethylene/methyl hydrogen maleate/ethyl acrylate copolymers, ethylene/methacrylic acid/vinyl acetate copolymers, ethylene/acrylic acid/vinyl alcohol copolymers, ethylene/propylene/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, ethylene/vinyl fluoride/methacrylic acid copolymers, and ethylene chlorotrifluoroethylene/methacrylic acid copolymers. Copolymers made from ethylene and acrylic acid, and terpolymers made from ethylene, methacrylic acid (or methacrylate) and an acrylate (e.g. ethyl acrylate) are preferred anti-drip polymer additives in the composition of this invention. The anti-drip polymer additives of this invention containing the carboxylic acid moieties, can also be neutralized with one or more basic compounds to form the salt of the carboxylic acid moieties. Part or all of such carboxylic acid moieties, for example 10–90%, more preferably 50–90% can be ionized with metal ions or with other materials such as an amine. This ionization can be, for example, be with a metal oxide or hydroxide. Preferably the ion is selected from one or more of sodium, potassium, zinc, aluminum, lithium, copper, magnesium and calcium. Polymers that are neutralized to a low level for example, less than 10% of the available acid moieties, are preferred, and more preferred are polymers that are not neutralized. Anti-drip polymer additives useful in the composition of this invention are available commercially. For example, Surlyn® polymer materials such as Surlyn® 9320W manufactured by E. I. duPont de Nemours and Company and Primacor polymer materials such as Primacor 1410XT, manufactured by Dow Chemical, are useful in the composition of this invention as anti-drip polymer additives. Surlyn® 9320W has been described in the literature as an ethylene/methacrylate/acrylic acid ester terpolymer neutralized with zinc. Primacor 1410 XT has been described in the literature as a copolymer of ethylene and acrylic acid wherein about 9.5 percent of the monomers present are from acrylic acid. The anti-drip polymer additives used in the polyamide composition of this invention preferably have a melt flow index below 50 and more preferably in the range of about 1 to about 15 g/10 min. measured by ASTM D-1238 at a temperature of 190° C. and at a load of 2.16 kg. Methods for preparing grafted copolymers are desclosed in U.S. Pat. No. 3,884,882. Methods for making the metal neutralized copolymers are in U.S. Pat. No. 3,264,272. These two patents are incorporated by reference herein.

The polyamides in the composition of this invention are made flame retardant by compounding with a flame retardant compound, typically an organohalogen compound, and preferably a high molecular weight organobromine compound.

Generally, the organohalogen compounds known in the art and described as halogen-containing fire-retardant compounds will be suitable for use in the practice of the invention and particularly desirable among them will be those generally characterized as bromine-containing flame retardants. Such compounds are available from commercial sources and include, for example, brominated polystyrene, available as Pyrocheck® from Ferro Corporation, brominated polyphenylene ether, available as PO64P from Great Lakes Corporation, and polydibromostyrene (PDBS), available from Teijin, Ltd. and as PDBS80 from Great Lakes Corporation.

Additional suitable halogenated compounds are also disclosed in the art such as, for example, polytribromostyrene, polypentabromostyrene, polydichlorostyrene, polytrichlorostyrene, polypentachlorostyrene and polytribromo-alpha-methylstyrene, as well as polydibromo-p-phenylene oxide, polytribromo-p-phenylene oxide, polydichloro-p-phenylene oxide, polybromo-p-phenylene oxide, and polybromo-o-phenylene oxide. A number of such compounds may be available from commercial sources. Polybrominated biphenyl, brominated phenoxy resins and the like, as well as chlorine-containing flame retardants such as Dechlorane®, are also available from a variety of commercial sources for use as flame retardants, and these may also be found useful in the practice of this invention. Polydibromostyrene (PDBS) flame retardants, are most preferred in the polyamide composition of this invention because they result in superior physical properties, such as the flow properties, of the polyamide composition.

Group IIA or IIB metal borates are useful in the practice of this invention as flame retardant synergists and include the alkaline earth metal borates such as strontium borate, barium borate, calcium borate, magnesium borate and zinc borate. Particularly useful are the variety of zinc borate compounds heretofore known and described for use as smoke suppressants and in reducing heat release characteristics for a variety of engineering thermoplastics. The forms of zinc borate readily available commercially for such use include hydrated compounds having the nominal composition $2ZnO \cdot 3B_2O_3 \cdot xH_2O$ where x is between 3.3 and 3.7, such as $2ZnO \cdot 3B_2O_3 \cdot 3.5H_2O$, available from U.S. Borax as Firebrake® ZB, as well as $4ZnO \cdot B_2O_3 \cdot H_2O$, available from the same source as Firebrake 415. Anhydrous $2ZnO \cdot 3B_2O_3$, available as Firebrake 500 may also be employed in the invented formulation. Other hydrates are also known and may also be found useful. Other known flame retardant synergists for polyamide formulations including antimony compounds such as antimony oxide, sodium antimonate, and potassium antimonate are useful.

Flame retardant formulations according to the invention will comprise polyamide together with a flame retardant effective amount of the flame retardant compound, suitably from about 10 to 100 pbw (parts by weight), preferably from about 45 to about 80 pbw flame retardant compound, and from about 0.5 to about 50 pbw, preferably from about 1 to about 15 pbw of the flame retardant synergist component per 100 pbw polyamide. The particular level of flame retardant and synergist employed for the practice of this invention will depend in part upon the particular polyamide and flame retardant compound selected. Where a bromine-containing flame retardant is employed, from about 45 to about 75 pbw of the flame retardant per 100 pbw polyamide, when used in combination with synergist, will be found to impart adequate flame retardant properties for most polyamides. Partially aromatic polyamides having a high level of aliphatic component may benefit from having a higher level of the flame retardant.

A flame retardant mixture of bromine-containing flame retardant and zinc borate that will be useful in partially aromatic polyamides will contain the two components at a weight ratio in the range of from about 4:1 to about 15:1, and for most purposes such mixtures will be found to impart adequate flame retardance when used at a weight ratio of about 5:1 to about 10:1.

The amount of anti-drip polymer added to the composition of this invention is an anti-drip effective amount. An anti-drip effective amount is preferably that amount which results in a flame test run according to UL Standard UL 94 with no drips falling during both the first and second burns specified in the flame test. Suitably, the level of anti-drip polymer additive is up to about 5 weight percent based on the total weight of the composition, preferably up to about 2 weight percent, more preferably up to about 1.5 weight percent based on the weight of the composition. The anti-drip polyamide composition of this invention is also effective when there is less than 1.5 weight percent, and less than 1 weight percent anti-drip polymer additive present in the composition. A preferred amount of anti-drip polymer additive is about 0.1 to about 2, more preferably about 0.2 to about 1.5 weight percent, and most preferably about 0.2 to less than 1.5 weight percent, and more preferably less than 1 weight percent based on the total weight of the polyamide composition.

With respect to the polyamide present in the formulation, the amount of anti-drip polymer additive can be less than 3 parts by weight (pbw) per hundred pbw of the polyamide present in the composition, suitably up to about 2.5 pbw, more preferably up to about 2.0 pbw per 100 pbw of the polymer present in the composition.

Optionally, the flame retarded polyamide compositions may further comprise from about 10 to about 60 wt. %, preferably from about 10 to about 45 wt. %, of a fibrous reinforcing agent. Fibrous reinforcing agents are added to such formulations in order to impart further improvement in heat resistance and fire-retardant properties, as well as to increase rigidity, tensile strength and flexural strength. Fibrous reinforcing agents suitable for use in the practice of this invention include any of the inorganic fibrous reinforcing agents such as glass fibers, potassium titanate fibers, metal-coated glass fibers, ceramic fibers, wollastonite, carbon fibers, metal carbide fibers and metal-hardened fibers. The surfaces of such fibrous reinforcing agents may be treated as necessary with conventional sizing agents, lubricants and the like. Glass fibers are preferred.

The polyamide compositions of this invention may further contain conventional additives widely known and used in the resin arts, provided such additives do not significantly affect the desirable flame retardant and anti-drip character of the formulation. For example, thermal stabilizers, UV stabilizers, plasticizers, nucleating agents, antistatic agents, processing aids including mold release agents, lubricants and the like, as well as pigments, dyes, inorganic or organic fillers such as carbon black, talc, clay, mica and the like may usefully be included.

Metal oxides and hydroxides such as calcium hydroxide, calcium oxide, magnesium hydroxide, magnesium oxide, zinc hydroxide, zinc oxides or other oxides or hydroxides of the Group II metals of the Periodic Table are preferably employed for the purpose of improving thermal stability. The oxides are preferred, and finely divided calcium oxide is particularly useful for this purpose. Generally, where the use of such additives is contemplated the amount employed will be from about 0.05 to about 50 pbw, preferably 0.1 to about 10 pbw per 100 pbw of the polyamide component, and may, also be characterized as being about 0.2 to about 2 wt. %, preferably from about 0.2 to about 1 wt. %, based on total weight of the composition, including such fillers, additives and fiber as may also be present.

Polymeric impact modifiers may also be desirable for use in these formulations, including polyolefins such as polyethylene, polypropylene and poly (4-methyl-1-pentene), olefin copolymers such as ethylene/propylene copolymer, ethylene/1-butene copolymer, propylene/ethylene copolymer and propylene/1-butene copolymer, polyolefin elastomers, and the like.

Blends of a high temperature polyphthalamide component with other polyamides such as nylon 6 or nylon 6.6 can be used in the compositions of this invention as well as blends comprising polyarylates, polycarbonates, polyacetals, polysulfones, polyphenylene oxides, and the like.

Any of the compounding processes commonly used in the resin compounding arts may be usefully employed for mixing the polyamide, flame retardant and the synergist component, together with fibrous reinforcing agents and such further additives as may be desired, to provide the compositions of this invention. For example, the solid components may be blended in finely divided form using a Henschel mixer, V-blender, ribbon blender or tumbler blender, and then melt processed in an extruder. The formulation may be profile-extruded to form the finished article, or may be provided as a strand or the like and then chopped, granulated or pulverized to provide the flame retarded formulation in a form suited to further melt fabrication, for example by injection molding, sheet extrusion or the like. Blending conditions, e.g., selection of screw design and extruder conditions such as temperature, should be selected to maintain a high molecular weight for the polyamide.

The invented compositions have excellent fire retardancy with low dripping, excellent heal resistance, rigidity and impact strength, a high heat distortion temperature, and can be readily molded. A variety of articles such as machine parts and electric and electronic component parts may be formed by conventional molding methods such as compression molding, injection molding, extrusion and other thermoforming operations. For example the composition of this invention can be used to make electrical connectors such as surface mount connectors, insulation for wire and cable, electrical film and tape, switches, circuit breakers, fuse holders, fuses, relays, terminal blocks, and switch gear, as well as articles such as pump housings, and under-the-hood automobile applications. The compositions of this invenion are particularly useful for manufacturing electrical connectors.

The invention will be better understood by consideration of the following examples.

EXAMPLES

In examples 1–6, blend formulations containing a polyphthalamide (PPA) copolymer, an anti-drip copolymer of an ethylenically unsaturated monomer and a carboxylic acid containing monomer, a flame retardant combination of a bromine-containing organic compound and sodium antimonate, were compared with examples containing no anti-drip copolymer.

The following analytical methods were employed to obtain the data necessary for the following examples.

Tensile Strength (Tensile) and Percent Elongation at Break (% EAB)

Procedures of ASTM D-638-1 were followed.

Kayeness Rheology

The sample was first dried to a moisture content <500 ppm using a vacuum oven at 100° C. The melt viscosity of the dried sample was measured in a Kayeness rheometer fitted with a capillary having a diameter of 0.04 inches, L/D ratio of 15/1 and an entrance angle of 90°, using test weight of 11.0 grams, a melt time of 188 seconds, a delay time of 87 seconds, and a melt force of 300 lbs. The sample was tested at a shear rate of 400 sec$^-$and 315° C. Melt viscosity in poise (or Kpoise) is shown after dwell times of 5 minutes (t5), 10 minutes (t10), and 15 minutes (t15).

Flame Test

The flame retardancy and the anti-drip ability of the copolymer were tested using Underwriters Laboraties Standard UL 94 using a sample test bar 1/32 inch thick. In this test, a test bar of the material to be tested is exposed to a flame for a period of 10 seconds. After removing the flame from the test bar sample, the number of drips which fall is recorded. Also recorded is the burn time, defined as the time the test bar remains on fire in the absence of the flame. When the fire goes out, the test bar is exposed to the flame for a second time for 10 seconds. The number of drips and burn time is recorded again. The final test report contains the total burn time and the total number of drips from both the first and second burn. The rating incorporates the number of drips that fall from the test bar during the test. (For each test, 5 test bars are used and the total drips and total burn times are reported.) In the standard test, if the drip is not in flames, then there is no debit in the rating. If the drip is flaming, then a lower rating results. We have used a modification of this test, where the number of drips are counted whether or not in flames. Thus, in data below, the 0/5 rating indicates that no drips fell during the test. i.e., zero drips for all 5 test bars.

The formulations of the examples were prepared using the following components:

Polyamide

PPA Hexamethylene terephthalamide/hexamethylene adipamide 55/45 mole ratio copolymer, obtained as Amodel A-6000 PPA polyphthalamide from Amoco Polymers, Inc.

Anti-Drip Polymers

The anti-drip polymer was either Surlyn 9320, obtained from DuPont, or Primacor 1410 XT, from Dow.

Flame Retardant

FR Poly(dibromostyrene) flame retardant, obtained as PDBS80 from Great Lakes Chemical Company.

Sodium Antimonate

Obtained as Polybloc® SAP-2 from Anzon Division of Cookson Specialty Additives.

Zinc Borate

Obtained as Firebrake® ZB from U.S. Borax

Additives

CaO Calcium oxide, obtained from Atlantic Equipment Engineers.

PTFE Polytetrafluoroethylene lubricant, obtained as Algoflon® DF-11X from Ausimont, USA.

Talc Obtained as Mistron® Vapor Talc from Luzenac America, Inc.

Glass Fiber Obtained as Certainteed 994 from Vetrotex Certainteed Inc.

All formulations in the Examples are given in wt. % based on total weight of the formulation, including fiber where present.

Examples 1–6

The composition of Examples 1–6 in Tables 1 and 2 were prepared by mixing the requisite amounts of PPA, anti-drip polymer and other additives, then melt extruding the blend using a Berstorff 25 mm twin screw extruder fitted with a #11 screw and vacuum vented at ca. 25 in Hg using barrel temperatures in the range of 320–325° C., melt temperatures of about 300–345° C. and a nominal screw speed of about 300 rpm.

Table 1 shows the formulation for Examples 1–6 and flame test, dripping. Tensile strength and % Elongation at Break data. Table 2 shows the Keyness Viscosity (Rheology) data.

TABLE 1

Flame Test, Dripping, Tensile Strength and % EAB

| Formulation | 1 | 2 | 3 | 4 | 5 | 6 (control) |
|---|---|---|---|---|---|---|
| PPA | 36.8 | 36.91 | 37.54 | 38.04 | 38.34 | 38.14 |
| NaAntimonate | 3.9 | 3.8 | 3.71 | 3.92 | 3.95 | 3.9 |
| FR | 24.2 | 22.5 | 22.96 | 23.25 | 23.42 | 23.28 |
| Glass Fiber | 30 | 33 | 33 | 33 | 33 | 33 |
| Anti-Drip Polymer (Surlyn) | 5 | 3 | 2 | 1 | 0.5 | 0.0 |
| CaO |  | 0.41 | 0.41 | 0.41 | 0.41 | 0.4 |
| Talc |  | 0.28 | 0.28 | 0.28 | 0.28 | 0.28 |
| PTFE | 0.1 | 0.1 | 0.1 | 0.1 | 0.1 | 1 |
| Flame Rating | V0 | V0 | V0 | V0 | V0 | V0 |
| Drips[a] | 0/5 | 0/5 | 0/5 | 0/5 | 4/5 | 5/5 |
| Tot. Burn Time[b] | 0 | 3 | 1 | 10 | 4 | 4 |
| Tensile (Kpsi) | 16.05 | 20.8 | 21.9 | 23.63 | 24.31 | 23.87 |
| % EAB | 1.2 | 1.5 | 1.5 | 1.6 | 1.6 | 1.5 |

[a]The 0/5 rating indicates no drips for all 5 test bars within the test. The 4/5 and 5/5 ratings indicate 4 and 5 drips, respectively. However, since all ratings were V/0, none of the drips were flaming.
[b]This is the total of the burn times for each of the 5 bars used for each test.

TABLE II

Keyness Viscosity (Poise) at 315° C. and 2400 sec -1

| Ex. | t5 | t10 | t15 |
|---|---|---|---|
| 2 | 4598 | 3754 | 3356 |
| 3 | 4242 | 3500 | 3066 |
| 4 | 3586 | 3092 | 2552 |
| 5 | 3622 | 2860 | 2578 |
| 6 | 3382 | 2022 | 2402 |

The data in Table 1 demonstrates the excellent flame retarding and excellent anti-drip properties of the present invention. In particular, the compositions of this invention shown in Table 1 have superior anti-drip performance even at very low levels of the anti-drip polymer in the formation.

The tensile data and % EAB data in Table 1 indicates that higher levels of the anti-drip polymer result in a decrease in tensile strength and a decrease in the elongation at break. In some applications, it may be desirable to use low levels of the anti-drip polymer in order to avoid any reduction in strength or elongation properties.

The data in Table Table II demonstrates that the viscosity of the formulations containing the anti-drip polymer increase with levels of anti-drip polymer over 1.5 weight percent. In some applications where the viscosity of the composition is an imported consideration, it may be be desirable to use the lower levels of the anti-drip polymer, i.e. levels of 1.5 weight percent and lower, for example, less than 1 weight percent based on the weight of the composition.

Levels of less than 1 weight percent of the anti-drip polymers based on the total composition are effective and it is surprising that the low levels of the anti-drip polymers of this invention are so effective, particularly at levels below 1 weight percent.

Example 7

The date in Table III show the excellent anti-drip performance of the compositions of this invention. This data shows the results for a formulation containing 0.9 weight percent of an anti-drip polymer additive. In two flame tests, no drips were formed.

Although the invention has been set forth herein and illustrated by particular embodiments and examples, those skilled in the polyamide art will readily understand that further modifications may be made without departing from the spirit and scope of the invention.

TABLE III

| Formulation (wt %) | | |
|---|---|---|
| PPA | 38.19 | |
| Na-Antimonate | 3.91 | |
| FR | 23.32 | |
| Glass Fiber | 33.00 | |
| Anti-Drip Polymer (Primacor) | 0.9 | |
| CaO | 0.4 | |
| Talc | 0.28 | |
| Drips | 0/5 | 0/5 |
| Flame Rating | V0 | V0 |
| Total Burn Time | 4 sec. | 13 sec |

Examples 8–14

The composition of Examples 8–14 were prepared by mixing the requisite amount of PPA, anti-drip polymer and the additives, then melt extruding the blend using a Berstoff 25 mm twin screw extruder filled with a #11 screw and vacuum vented at ca.25 in Hg using barrel temperatures in the range of 320 to 325° C. melt temperatures of about 300 to 345° C., and a nominal screw speed of about 300 rpm.

Table IV shows the formulation for Examples 8–14 and flame test, dripping, tensile strength, %EAB and Keyness Viscosity.

These data also shows the excellent anti-drip performance of the composition of this invention.

TABLE IV

Flame Test, Dripping, Tensile Strength, % EAP And Keyness Viscosity

| Formulation | 8 | 9 | 10 | 11 | 12 | 13 | 14 |
|---|---|---|---|---|---|---|---|
| PPA | 38.14 | 38.43 | 37.85 | 38.14 | 38.6 | 38.31 | 38.02 |
| Na Antimonate | 3.9 | 3.93 | 3.87 | 3.9 | | | |
| Zinc borate | | | | | 3.95 | 3.92 | 3.89 |
| FR | 23.28 | 23.46 | 23.1 | 23.28 | 23.54 | 23.36 | 23.18 |
| Glass Fiber | 33 | 33 | 33 | 33 | 33 | 33 | 33 |
| Anti-Drip Polymer | | | | | | | |
| Surlyn | | | | | 0.5 | 1 | 1.5 |
| Primacor | 1 | 0.5 | 1.5 | | | | |
| Algoflon | | | | 1 | | | |
| CaO | 0.4 | 0.4 | 0.4 | 0.4 | 0.41 | 0.41 | 0.41 |
| Talc | 0.28 | 0.28 | 0.28 | 0.28 | | | |
| Flame Rating | V0 | V0 | V0 | V0 | V0 | V0 | V0 |
| Drips[a] | 0/5 | 0/5 | 0/5 | 0/5 | 0/5 | 0/5 | 0/5 |
| Tot. Burn Time[b] | 4 | 12 | 5 | 11 | 4 | 5 | 6 |
| Tensile (Kpsi) | 22.09 | 21.4 | 22.09 | 21.34 | 23.2 | 22.78 | 21.9 |
| % EAB | 1.5 | 1.5 | 1.5 | 1.3 | 1.6 | 1.5 | 1.5 |
| Keyness (t5)[c] | 4.31 | 3.77 | 3.89 | 3.57 | 3.69 | 4.18 | 4.3 |

[a]See footnote Table I.
[b]See footnote Table I.
[c]Kpoise, dwell time of 5 minutes, i.e. t5.

That which is claimed is:

1. A composition comprising a high temperature polyphthalamide, a flame retardant amount of a bromine-containing organic compound and from about 0.1 to about 5 weight percent, based on the weight of the composition of an anti-drip polymer consisting of ethylene and acrylic acid.

2. The composition of claim 1 wherein the anti-drip polymer is present in an amount of up to 1.5 weight percent based on the weight of the composition.

3. The composition of claim 1 wherein the anti-drip polymer is present in an amount of less than 1 weight percent based on the weight of the composition.

4. The composition of claim 1, further comprising a flame retardant synergist selected from the group consisting of zinc borate and sodium antimonate.

5. A composition comprising 100 pbw partially aromatic polyamide, from about 0.5 to about 150 pbw of a bromine-containing organic compound and from about 0.1 to about 1 weight percent based on the total weight of the composition of an anti-drip polymer additive consisting of ethylene and acrylic acid.

6. The composition of claim 5 wherein said polyamide formulation further comprises from about 10 to about 60 wt. % glass fiber, based on total weight of the formulation.

7. The composition of claim 5 wherein said polyamide is a copolymer comprising at least about 40 mole % recurring aliphatic diamine terephthalamide units having the structure

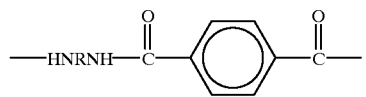

wherein R comprises at least one aliphatic hydrocarbyl radical selected from the group consisting of substituted and unsubstituted aliphatic radicals having from about 2 to about 14 carbon atoms.

8. The composition of claim 5 wherein said polyamide is a copolymer comprising at least about 40 mole % recurring aliphatic diamine terephthalamide units having the structure

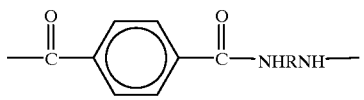 A

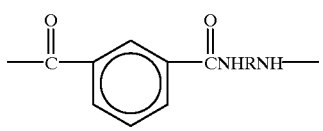 B

 C wherein R comprises at least one aliphatic hydrocarbyl radical selected from the group consisting of substituted and unsubstituted aliphatic radicals having from about 2 to about 14 carbon atoms; and recurring aliphatic diamine aliphatic diamide units selected from the group consisting of hexamethylene adipamide, 2-methylpentamethylene adipamide, hexamethylene sebacamide, hexamethylene azeleamide, hexamethylene dodecamethylamide, hexamethylene cyclohexanedicarboxylamide and dodecamethylene adipamide.

9. The composition of claim 5, further comprising a flame retardant synergist selected from the group consisting of zinc borate and sodium antimonate.

10. A flame-retardant, anti-dripping polyphthalamide composition comprising a high temperature polyphthalamide, a halogen containing organic compound and an anti-drip effective amount of a polymer consisting of ethylene and acrylic acid.

11. The composition of claim 10 containing from about 0.1 to about 2 weight percent of said copolymer, based on the total weight of the composition.

12. The composition of claim 10 wherein said copolymer is an ethylene-acrylic acid copolymer containing from about 0.1 to about 25 weight percent acrylic acid, based on the weight of said copolymer.

13. The composition of claim 10 further comprising from about 10 to about 60 wt. %, based on total composition, glass fiber.

14. An injection-molded article comprising the composition of claim 10.

15. An extruded article comprising the composition of claim 10.

16. The composition of claim 10 wherein said copolymer has a melt flow index below 50.

17. The composition of claim 10 wherein the copolymer is an ethylene-acrylic acid copolymer and wherein about 9.5 percent of the monomers present are from acrylic acid.

18. The composition of claim 10, further comprising a flame retardant synergist selected from the group consisting of zinc borate and sodium antimonate.

19. A method for improving the anti-drip properties of a polyamide composition comprising adding to the polyamide composition an anti-drip effective amount of an anti-drip polymer additive consisting of ethylene and acrylic acid.

20. The method of claim 19 wherein the polyamide composition contains a halogen-containing organic flame retardant.

* * * * *